US012436235B2

(12) United States Patent
Xu et al.

(10) Patent No.: US 12,436,235 B2
(45) Date of Patent: Oct. 7, 2025

(54) SYSTEM FOR ECHO INTENSITY CALIBRATION BASED ON CONTINUOUS WAVE WEATHER RADAR DATA

(71) Applicants: Nanjing Joint Institute for Atmospheric Sciences, Nanjing (CN); Jiangsu Institute of Meteorological Sciences, Nanjing (CN)

(72) Inventors: Fen Xu, Nanjing (CN); Kangyuan Sun, Nanjing (CN); Gang Chen, Nanjing (CN); Shushi Zhang, Nanjing (CN)

(73) Assignees: Nanjing Joint Institute for Atmospheric Sciences, Nanjing (CN); Jiangsu Institute Meteorological Sciences, Nanjing (CN)

( * ) Notice: Subject to any disclaimer, the term of this patent is extended or adjusted under 35 U.S.C. 154(b) by 472 days.

(21) Appl. No.: 17/892,171

(22) Filed: Aug. 22, 2022

(65) Prior Publication Data
US 2022/0404461 A1 Dec. 22, 2022

(30) Foreign Application Priority Data
Mar. 29, 2022 (CN) .......................... 202210314856.0

(51) Int. Cl.
*G01S 7/40* (2006.01)
*G01S 13/95* (2006.01)

(52) U.S. Cl.
CPC ................ *G01S 7/40* (2013.01); *G01S 13/95* (2013.01)

(58) Field of Classification Search
CPC ........ G01S 7/40; G01S 7/4004; G01S 7/4017; G01S 13/95; G01S 13/89; G01W 1/02; G01W 1/18
USPC ..................................... 342/26 R, 176; 702/3
See application file for complete search history.

(56) References Cited

U.S. PATENT DOCUMENTS

| | | | | |
|---|---|---|---|---|
| 3,646,555 | A * | 2/1972 | Atlas ....................... | G01S 13/95 342/26 R |
| 5,172,118 | A * | 12/1992 | Peregrim ............ | G01S 13/4454 342/191 |
| 5,172,122 | A * | 12/1992 | Peregrim .............. | G01S 13/904 342/174 |
| 5,198,819 | A * | 3/1993 | Susnjara ................... | G01S 7/20 342/26 B |
| 5,225,839 | A * | 7/1993 | Okurowski ............. | G01S 7/032 342/174 |
| 5,313,210 | A * | 5/1994 | Gail ...................... | G01S 7/4004 342/191 |

(Continued)

*Primary Examiner* — Michael W Justice
(74) *Attorney, Agent, or Firm* — Hemisphere Law, PLLC; Zhigang Ma

(57) ABSTRACT

The present disclosure discloses a system for echo intensity calibration based on continuous wave weather radar data. The system includes a communication module used for establishing a network protocol or local protocol-based communication link between a radar receiver and a radar terminal computer; a main control module which is in communication connection with the communication module to receive radar data of the radar receiver or a control signal of the radar terminal computer and execute an echo intensity calibration strategy; and a storage module which temporarily stores continuous wave weather radar data, and aircraft echo power values that are identified by the main control module within a period of time.

3 Claims, 3 Drawing Sheets

(56) References Cited

U.S. PATENT DOCUMENTS

| | | | | |
|---|---|---|---|---|
| 5,440,483 | A * | 8/1995 | Badoche-Jacquet | G01W 1/14 73/170.19 |
| 5,563,604 | A * | 10/1996 | Brandao | G01S 13/951 342/159 |
| 5,940,523 | A * | 8/1999 | Cornman | G01S 13/95 342/171 |
| 6,307,500 | B1 * | 10/2001 | Cornman | G01S 13/951 702/3 |
| 7,541,970 | B1 * | 6/2009 | Godfrey | G01S 13/953 342/182 |
| 7,589,666 | B2 * | 9/2009 | Passarelli, Jr. | G01S 13/5244 342/194 |
| 9,057,785 | B1 * | 6/2015 | Lee | G01S 13/95 |
| 9,297,888 | B2 * | 3/2016 | Lee | G01S 13/95 |
| 10,330,786 | B1 * | 6/2019 | Musgrove | G01S 7/023 |
| 10,795,017 | B2 * | 10/2020 | Kawai | G01S 7/025 |
| 11,391,816 | B2 * | 7/2022 | Lee | G01S 7/4021 |
| 11,402,542 | B2 * | 8/2022 | Rothenberg | G06N 20/20 |
| 11,879,970 | B2 * | 1/2024 | Sakamaki | G01S 13/582 |
| 11,892,535 | B2 * | 2/2024 | Sakamaki | G01S 13/95 |
| 11,927,666 | B2 * | 3/2024 | Sakamaki | G01S 13/20 |
| 2008/0001808 | A1 * | 1/2008 | Passarelli, Jr. | G01S 13/5244 342/26 R |
| 2012/0271583 | A1 | 10/2012 | Xu et al. | |
| 2015/0086094 | A1 | 3/2015 | Chang et al. | |
| 2016/0011300 | A1 * | 1/2016 | Lee | G01S 13/524 342/127 |
| 2018/0252798 | A1 | 9/2018 | Bilik et al. | |
| 2018/0292530 | A1 * | 10/2018 | Kawai | G01S 7/42 |
| 2020/0132884 | A1 * | 4/2020 | Rothenberg | G06N 5/04 |
| 2021/0231790 | A1 * | 7/2021 | Sakamaki | G01S 13/95 |
| 2021/0239830 | A1 * | 8/2021 | Sakamaki | G01W 1/10 |
| 2021/0302562 | A1 * | 9/2021 | Sakamaki | G01S 13/20 |
| 2022/0065988 | A1 * | 3/2022 | Lee | G01S 13/951 |

\* cited by examiner

SYSTEM FOR ECHO INTENSITY CALIBRATION BASED ON CONTINUOUS WAVE WEATHER RADAR DATA

TECHNICAL FIELD

The present disclosure belongs to the technical field of radar echo intensity data calibration, specifically to a system for echo intensity calibration based on continuous wave vertically pointing weather radar data.

BACKGROUND

The formation of cloud and precipitation is a very complex microphysical process, and the study on the vertical structure of cloud and precipitation helps people to understand the formation mechanism of cloud and precipitation. The research on this part mainly relies on the high-resolution continuous wave vertically pointing weather radar for vertical detection. The function and structure of this radar are quite different from that of traditional weather radar. To obtain a higher resolution, a radar is often designed using a continuous wave system, so that the structure is also more concise and fixed. Two antennas are vertically upwards. There is no servo system. One antenna is used for transmitting electromagnetic signals, and the other antenna is used for receiving electromagnetic signals.

The performance of a microwave device will change in a working process, which will lead to a deviation of performance indexes of the whole radar and ultimately affect the accuracy of the radar echo intensity. This greatly affects and misleads the use of the continuous wave weather radar to study the vertical structures of cloud and precipitation. At present, the calibration of the echo intensity of the continuous wave weather radar mainly relies on a special instrument to test an entire radar system. A specific method is to inject an output signal of a standard signal source into the radar system, calculate a radar output signal, and compare it with a theoretical result, and determine a deviation of the echo intensity output by the radar system.

Although it is true and reliable to use an instrument to detect the entire radar system and then calibrate the echo intensity, in an actual operation process, for a radar using a continuous wave system, the normal observation of the radar needs to be interrupted, so the calibration can only be carried out regularly, but the performance of the radar system may be deviated at any time. This results in irreconcilable contradictions in use of a radar using a continuous wave system. On the one hand, the radar needs to work continuously and cannot be interrupted. On the other hand, the accuracy of radar data cannot be ensured since the radar cannot be stopped to calibrate the echo intensity.

In addition, the calibration process of the current continuous wave system radar needs to be completed by professional technicians, which indirectly increases the use cost and maintenance cost of the radar.

SUMMARY

Invention purpose: the invention aims to provide a system for echo intensity calibration based on continuous wave weather radar data online in view of the deficiency of the prior art. Without shutdown, the echo intensity of a radar is calibrated according to an echo numerical value of a specific target observed by the radar, and the accuracy and consistency of radar data are detected on line.

Technical solution: The system for echo intensity calibration based on continuous wave weather radar data includes:

a communication module used for establishing a network protocol or local protocol-based communication link between a radar receiver and a radar terminal computer;

a main control module which is in communication connection with the communication module to receive radar data of the radar receiver or a control signal of the radar terminal computer and execute an echo intensity calibration strategy;

wherein the echo intensity calibration strategy includes

A, target identification and echo power calculation: reading the radar data of the radar receiver, identifying the object in the radar data as the observation data of the aircraft, and sending an identified aircraft echo power value and the corresponding radar data to a storage module together;

B, online calibration of echo intensity: extracting all aircraft echo power values in the storage module within a period of time, and determining a fluctuation of echo power to achieve online calibration for the echo intensity of a continuous wave weather radar; and a storage module which temporarily stores continuous wave weather radar data, and the aircraft echo power values that are identified by the main control module within a period of time.

According to a further preferable technical solution of the present disclosure, specific steps of the target identification and echo power calculation in the echo intensity calibration strategy are formulated as follows:

A1, respectively extracting, by the main control module, four parameters, i.e., the echo intensity, a Doppler velocity, a velocity spectrum width and the echo power from the continuous wave weather radar data sent by the radar receiver, and respectively denoting the four parameters as Z, V, W and P;

A2, respectively converting the four extracted parameters to a height-product coordinate system, and performing the quality control of the four parameters;

A3, regrouping the echo intensity signals according to a standard that one group contains 20 grid points, wherein regrouped echo intensity arrays are respectively $RZ_1$, $RZ_2$, ..., $RZ_i$; calculating a mean square error of each group of data to obtain $RZ\_VAR_1$, $RZ\_VAR_2$, ..., $RZ\_VAR_i$, totally i results; finding out a maximum value among the results and a corresponding position of the maximum value, respectively denoted as MAX_RZ_VAR and MAX_RZ_VAR_INDEX; then finding out a maximum value in the $RZ_{MAX\_RZ\_VAR\_INDEX}$ and a corresponding position of the maximum value in original echo intensity data, respectively denoted as RZ_MAX and Z_MAX_INDEX;

A4, determining whether the numerical value of RZ_MAX is greater than 40 dBZ, and if yes, marking TRUE1;

determining whether the Doppler velocities from $V_{Z\_MAX\_INDEX-5}$ to $V_{Z\_MAX\_INDEX+5}$ include a positive velocity large value center and a negative velocity large value center; if yes, determining whether a difference between absolute values of the positive and negative velocity large value centers is greater than or equal to 1 m/s; if yes, marking TRUE2;

determining whether a value of the velocity spectrum width $W_{Z\_MAX\_INDEX}$ is greater than 2, and if yes, marking TRUE3;

determining whether a value of the echo power $P_{Z\_MAX\_INDEX}$ is greater than −100 dBm, and if yes, marking TRUE4; and A5, if TRUE1, TRUE2, TRUE3 and TRUE4 all exist, determining that target region echo is generated by an aircraft; sending the echo power $P_{Z\_MAX\_INDEX}$ and the corresponding position Z_MAX_INDEX together with the radar data of the radar receiver to the storage module by the main control module, and recording and saving the echo power, the corresponding position and the radar data as one sample.

As a preference, specific steps of online echo intensity calibration in the echo intensity calibration strategy are formulated as follows:

B1, extracting all the samples within a period of time in the storage module by the main control module, and processing the corresponding echo power $P_{Z\_MAX\_INDEX}$ to the standard height according to Z_MAX_INDEX in the various samples to obtain $PR_{Z\_MAX\_INDEX}$;

B2, checking the type of an aircraft over a radar station according to civil aviation information, and performing radar cross section (RCS) correction to obtain RCS_$PR_{Z\_MAX\_INDEX}$ used as a final determination basis; and B3, comparing, by the main control module, final values RCS_$PR_{Z\_MAX\_INDEX}$ of all the samples, determining whether the fluctuation of the value is greater than 2, and calibrating the stability of a continuous wave weather radar system on line.

Preferably, the main control module takes TWMS320C6455BNCTZ as a main chip.

Preferably, the communication module adopts a gigabit network card chip Intel82576EB, and communicates with the radar receiver and the radar terminal computer based on a User Datagram Protocol (UDP) protocol.

Preferably, the storage module takes W25Q128FV as main storage equipment.

Beneficial effects: The system for echo intensity calibration based on continuous wave weather radar data is constructed in the present disclosure. The communication module transmits radar data; the main control module executes the echo intensity calibration strategy, by which, observed data indicating that a target is an aircraft is screened out from the continuous wave weather radar's base data; the echo power is processed; the stability of the performance of the radar is determined according to a fluctuation of the echo power, thus achieving online calibration without shutdown; and in the calibration process, radar's observation of other weather echo is not affected, and the continuity of observed data is guaranteed. Meanwhile, the calibration can be automatically completed without manual operation, so that no professional technician are required to complete the calibration process, and the maintenance cost of the radar is indirectly saved. The system is applicable to calibrating the echo intensity of all continuous wave weather radars, and can quickly detect a change in the performance of a radar without shutdown to timely calibrate the radar, improve the accuracy of radar data and ensure the consistency of radar observed data.

DETAILED DESCRIPTION OF THE EMBODIMENTS

The technical solutions of the present disclosure are described in detail below through the accompanying drawings. However, the protection scope of the present disclosure is not limited to the embodiments.

Figure 1:
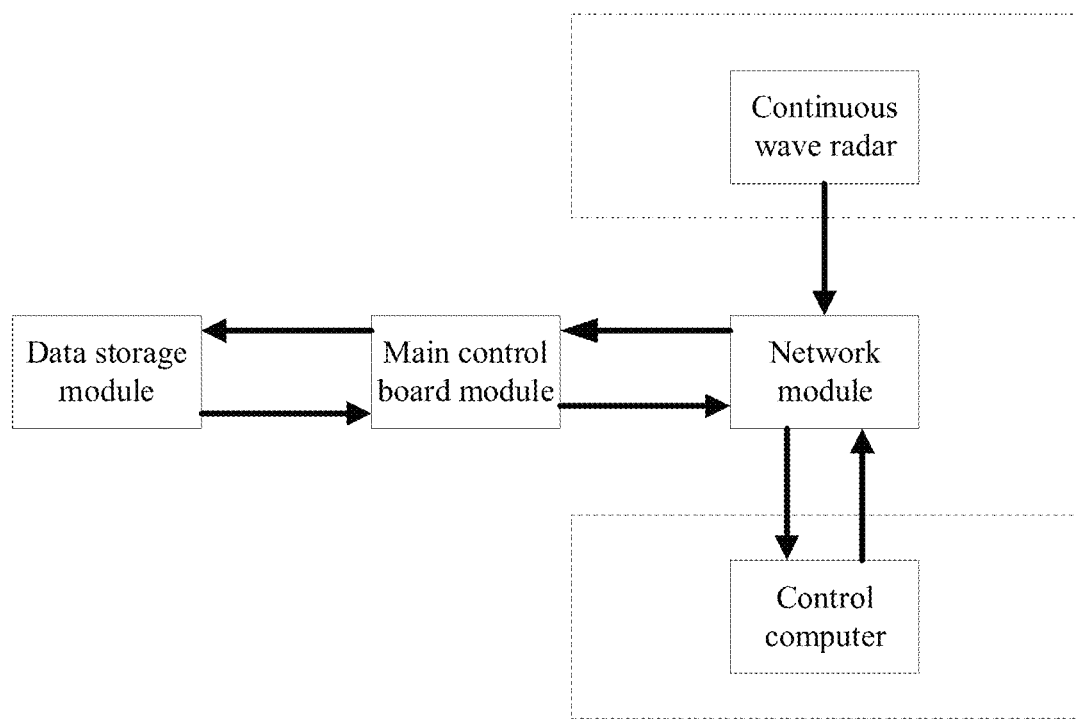
FIG. 1 is a structural block diagram of a system of the present disclosure.

Embodiment: A system for echo intensity calibration based on continuous wave weather radar data, as shown in FIG. 1, includes a communication module, a main control module and a storage module.

The communication module adopts a gigabit network card chip Intel82576EB, and communicates with a radar receiver based on a UDP protocol. The communication module is used for establishing a communication link between the radar receiver and the radar terminal computer, transmitting an echo signal received by a continuous wave weather radar, and sending a processed result to a radar data computer terminal.

The main control module takes TWMS320C6455BNCTZ as a main chip and is in communication connection with the communication module to receive radar data of the radar receiver or a control signal of a radar terminal computer and execute an echo intensity calibration strategy.

The storage module takes W25Q128FV as main storage equipment and temporarily stores continuous wave weather radar data, and aircraft echo power values that are identified by the main control module within a period of time.

Figure 2:
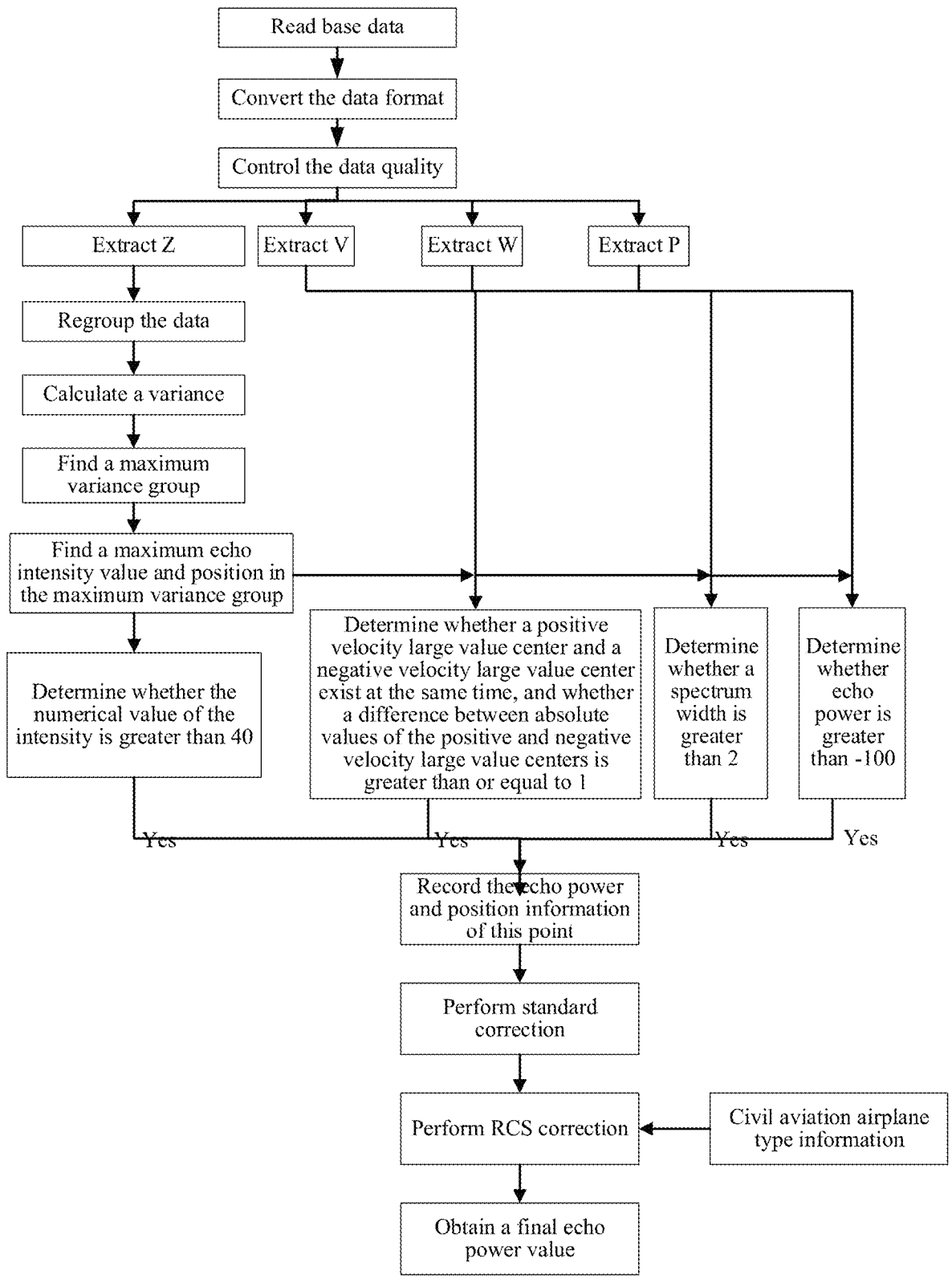
FIG. 2 is a flow chart of execution of an echo intensity calibration strategy of the present disclosure.

The echo intensity calibration strategy is executed by the main control module, as shown in FIG. 2, including two stages:

A, target identification and echo power calculation:

A1, the main control module respectively extracts four parameters, i.e., the echo intensity, a Doppler velocity, a velocity spectrum width and the echo power, from the continuous wave weather radar data sent by the radar receiver, and respectively denotes the four parameters as Z, V, W and P.

A2, the four extracted parameters are respectively converted to a height-product coordinate system to perform quality control on the four parameters, including data smoothing, removal of singular points and other conventional weather radar data processing methods.

A3, the echo intensity signals are regrouped, wherein there are totally 500 grid points in the original echo intensity signals, which are regrouped according to a standard that one group contains 20 grid points, and echo intensity arrays after regrouping are respectively $RZ_1, RZ_2, \ldots, RZ_i$, totally 25 groups; a mean square error of each group of data is calculated as $RZ\_VAR_1, RZ\_VAR_2, \ldots, RZ\_VAR_i$, totally i sets of results; a maximum value among the results and a corresponding position of the maximum value are found out, which are respectively denoted as MAX_RZ_VAR and MAX_RZ_VAR_INDEX; and a maximum value in the $RZ_{MAX\_RZ\_VAR\_INDEX}$ and a corresponding position of the maximum value in the original echo intensity data are found out, which are respectively denoted as RZ_MAX and Z_MAX_INDEX.

A4, it is determined whether numerical values of the Doppler velocity, the velocity spectrum width and the echo power at this position meet a threshold identification requirement, wherein specific thresholds and descriptions are shown in Table1:

whether the numerical value of RZ_MAX is greater than 40 dBZ is determined, and if yes, TRUE1 is marked;

it is determined whether the Doppler velocities from $V_{Z\_MAX\_INDEX-5}$ to $V_{Z\_MAX\_INDEX+5}$ include a large positive velocity value center and a large negative velocity value center; if yes, it is determined whether a difference between absolute values of the positive and negative velocity large value centers is greater than or equal to 1 m/s; if yes, TRUE2 is marked;

it is determined whether a value of the velocity spectrum width $W_{Z\_MAX\_INDEX}$ is greater than 2, and if yes, TRUE3 is marked;

it is determined whether a value of the echo power $P_{Z\_MAX\_INDEX}$ is greater than −100 dBm, and if yes, TRUE4 is marked.

TABLE 1

Table of thresholds of echo intensity, Doppler velocity, velocity spectrum width and echo power

| Method description | Symbol | Default threshold | Explanation |
|---|---|---|---|
| Aircraft echo intensity threshold | Z | 40 dBZ | According to the statistics of a large number of aircraft echo signals, more than 99% of the aircraft echo signals have echo intensity greater than 35 dBZ. Since an aircraft signal velocity has an obvious characteristic, and the radar echo intensity is displayed with a colorbar at an interval of 5 dBZ, the echo intensity is enlarged to 40 dBZ. |
| Velocity threshold of the aircraft | V | There are obvious positive and negative velocity values in successive 10 sets of data | When the aircraft is flying, the wake flow produces obvious Doppler velocity characteristics, so there are obvious positive and negative velocity characteristics |
| Velocity threshold of the aircraft | W | 2 | For the same reason as the velocity threshold, the velocity spectrum width is basically greater than 2 by statistical analysis |
| Echo power of the air plane | P | −100 dBm | The reason is the same as that of the echo intensity threshold |

A5, if TRUE1, TRUE2, TRUE3 and TRUE4 are all marked, it is determined that target region echo is generated by an aircraft; the main control module sends the echo power $P_{Z\_MAX\_INDEX}$ and the corresponding position Z_MAX_INDEX together with the radar data of the radar receiver to the storage module; and the echo power, the corresponding position and the radar data are recorded and saved as one sample.

B, online echo intensity calibration:

B1, because the echo power received by the radar is inversely proportional to a distance, the same target object produces different echo power at different altitudes. In order to compare the stability of the performance of the radar, the distance needs to be subjected to standardized correction. The main control module extracts all the samples within a period of time in the storage module, and processes the corresponding echo power $P_{Z\_MAX\_INDEX}$ to a standard height according to Z_MAX_INDEX in the various samples to obtain $PR_{Z\_MAX\_INDEX}$.

B2, the size of backscattering RCS of different targets is also different. Common civil aircrafts include Boeing and Airbus. Real-time flight routes can be queried via a network. The type of an aircraft over a radar station is checked according to civil aviation information, so the RCS correction can be performed to obtain $RCS\_PR_{Z\_MAX\_INDEX}$ used as a final determination basis.

B3, the main control module compares final values $RCS\_PR_{Z\_MAX\_INDEX}$ of all the samples, and if the fluctuation of the value is greater than 2, the calibration will be performed on the stability of the continuous wave weather radar system on line.

Figure 3:
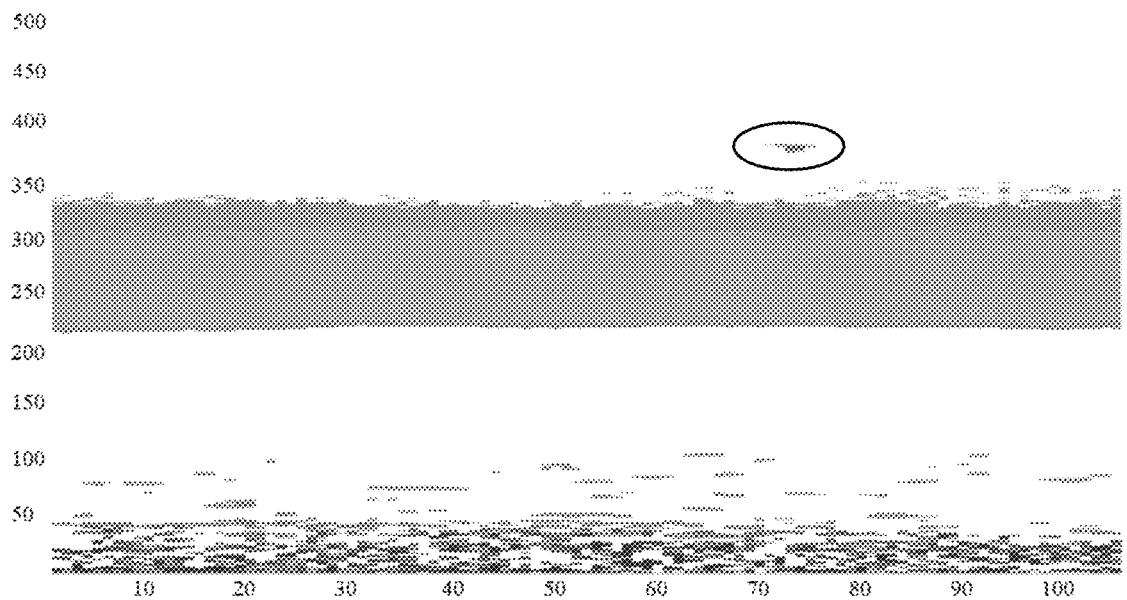
FIG. 3 is a diagram of an echo signal of an aircraft target identified in an embodiment of the present disclosure.
Figure 4:
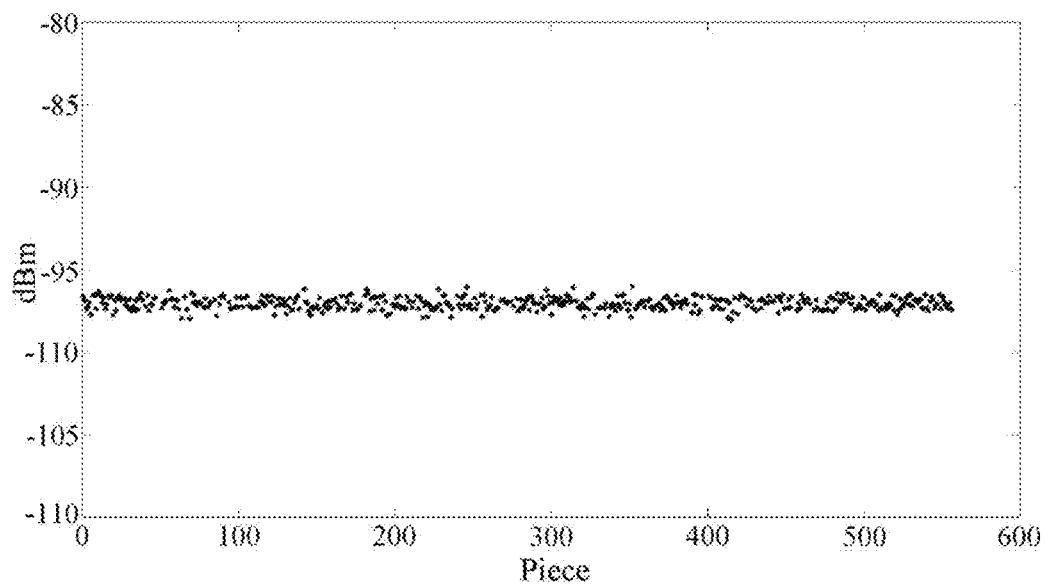
FIG. 4 is a diagram of echo power of an identified aircraft signal after correction in an embodiment of the present disclosure.

In order to verify the validness of this method, this method is verified and analyzed using data (from July to October, 2021) of a C-band continuous wave weather radar of Jiangning District in Nanjing, Jiangsu, China measured by Jiangsu Meteorological Bureau. An echo signal of an identified aircraft target is circled in FIG. 3, and FIG. 4 shows a diagram of echo power of an identified aircraft signal after correction. As can be seen in FIG. 4, a received echo power value is stable. A fluctuation between −96 dBm to −98 dBm represents to a certain extent that the performance of this radar is stable within this range, and the radar data quality does not have an obvious deviation.

As mentioned above, although the present disclosure has been shown and described with reference to specific preferred embodiments, these should not be construed as limiting the present disclosure itself. Various changes in form and details may be made to the present disclosure without departing from the spirit and scope of the present disclosure as defined by the appended claims.

What is claimed is:

1. A system for echo intensity calibration based on continuous wave weather radar data, comprising:
    a communication module used for establishing a network protocol or local protocol-based communication link between a continuous wave weather radar and a radar terminal computer;
    a main control module which is in communication connection with the communication module to receive radar data of the continuous wave weather radar or a control signal of the radar terminal computer and execute an echo intensity calibration strategy; and
    a storage module;

wherein the echo intensity calibration strategy comprises:
A, target identification and echo power calculation: reading the radar data of the continuous wave weather radar, identifying the object in the radar data as the observation data of the aircraft, and sending an identified aircraft echo power value and the corresponding radar data to the storage module together;
B, online calibration of echo intensity: extracting all aircraft echo power values in the storage module within a period of time, and determining a fluctuation of echo power to achieve online calibration for the echo intensity of the continuous wave weather radar; and
the storage module is configured to temporarily store continuous wave weather radar data and the aircraft echo power values that are identified by the main control module within a period of time;
wherein specific steps of the target identification and echo power calculation in the echo intensity calibration strategy are formulated as follows:
A1, respectively extracting, by the main control module, four parameters, i.e., the echo intensity, a Doppler velocity, a velocity spectrum width and the echo power from the continuous wave weather radar data sent by the continuous wave weather radar, and respectively denoting the four parameters as Z, V, W and P;
A2, respectively converting the four extracted parameters to a height-product coordinate system, and performing the quality control of the four parameters;
A3, regrouping the echo intensity signals according to a standard that one group contains 20 grid points, wherein regrouped echo intensity arrays are respectively $RZ_1, RZ_2, \ldots, RZ_i$; calculating a mean square error of each group of data to obtain $RZ\_VAR_1, RZ\_VAR_2, \ldots, RZ\_VAR_i$, totally i results; finding out a maximum value among the results and a corresponding position of the maximum value, respectively denoted as MAX_RZ_VAR and MAX_RZ_VAR_INDEX; then finding out a maximum value in the $RZ_{MAX\_RZ\_VAR\_INDEX}$ and a corresponding position of the maximum value in original echo intensity data, respectively denoted as RZ_MAX and Z_MAX_INDEX;
A4, determining whether the numerical value of RZ_MAX is greater than 40 dBZ, and if yes, marking TRUE1;
determining whether the Doppler velocities from $V_{Z\_MAX\_INDEX-5}$ to $V_{Z\_MAX\_INDEX+5}$ comprise a positive velocity large value center and a negative velocity large value center; if yes, determining whether a difference between absolute values of the positive and negative velocity large value centers is greater than or equal to 1 m/s; if yes, marking TRUE2;
determining whether a value of the velocity spectrum width $W_{Z\_MAX\_INDEX}$ is greater than 2, and if yes, marking TRUE3;
determining whether a value of the echo power $P_{Z\_MAX\_INDEX}$ is greater than −100 dBm, and if yes, marking TRUE4; and
A5, if TRUE1, TRUE2, TRUE3 and TRUE4 all exist, determining that target region echo is generated by an aircraft; sending the echo power $P_{Z\_MAX\_INDEX}$ and the corresponding position Z_MAX_INDEX together with the radar data of the continuous wave weather radar to the storage module by the main control module, and recording and saving the echo power, the corresponding position and the radar data as one sample.

2. The system for echo intensity calibration based on the continuous wave weather radar data according to claim 1, wherein specific steps of online echo intensity calibration in the echo intensity calibration strategy are formulated as follows:
B1, extracting all the samples within a period of time in the storage module by the main control module, and processing the corresponding echo power $P_{Z\_MAX\_INDEX}$ to be the standard height according to Z_MAX_INDEX in the various samples to obtain $PR_{Z\_MAX\_INDEX}$;
B2, checking the type of an aircraft over a radar station according to civil aviation information, and performing radar cross section (RCS) correction to obtain $RCS\_PR_{Z\_MAX\_INDEX}$ used as a final determination basis; and
B3, comparing, by the main control module, final values $RCS\_PR_{Z\_MAX\_INDEX}$ of all the samples, determining whether the fluctuation of the value is greater than 2, and calibrating the stability of a continuous wave weather radar system on line.

3. The system for echo intensity calibration based on the continuous wave weather radar data according to claim 1, wherein the communication module adopts a gigabit network card chip, and communicates with the continuous wave weather radar and the radar terminal computer based on a User Datagram Protocol (UDP) protocol.

* * * * *